Figure 1:
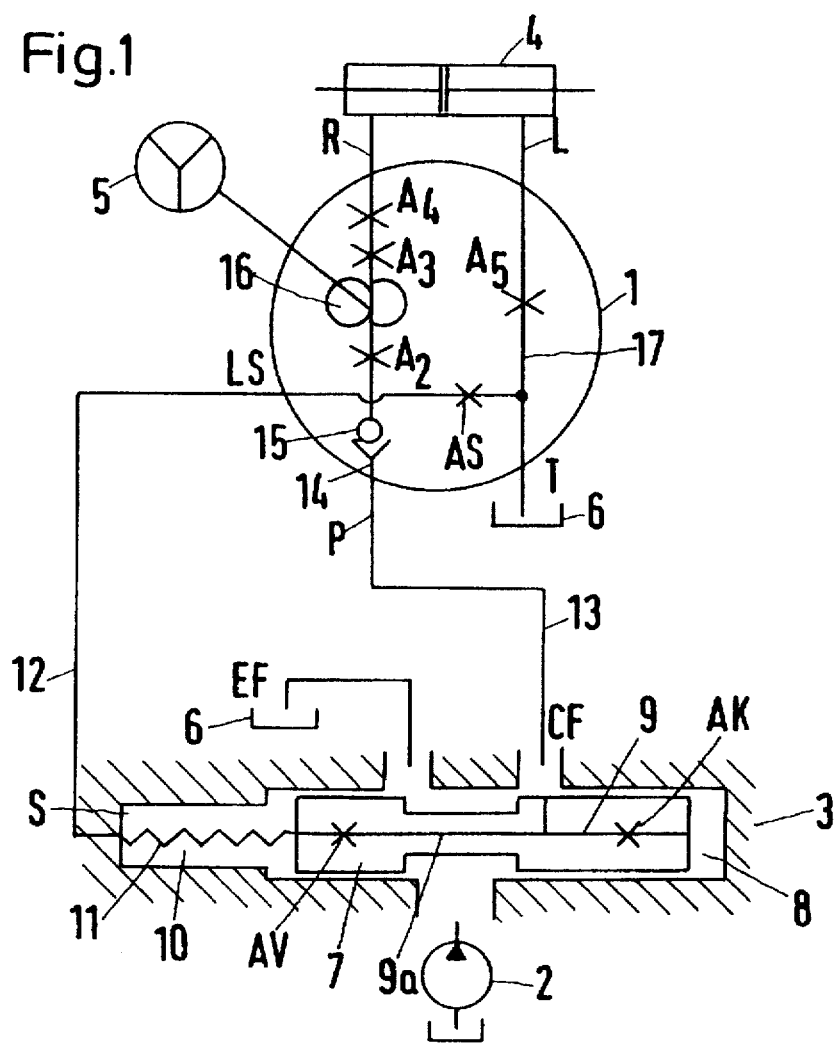

United States Patent [19]
Arbjerg

[11] Patent Number: 5,701,970
[45] Date of Patent: Dec. 30, 1997

[54] DEVICE FOR CONTROLLING THE PRESSURE TO BE SUPPLIED TO A HYDROSTATIC STEERING UNIT

[75] Inventor: Niels Arbjerg, Sydals, Denmark

[73] Assignee: Danfoss A/S, Nordborg, Denmark

[21] Appl. No.: 663,204

[22] PCT Filed: Dec. 14, 1994

[86] PCT No.: PCT/DK94/00466
§ 371 Date: Jun. 5, 1996
§ 102(e) Date: Jun. 5, 1996

[87] PCT Pub. No.: WO95/16599
PCT Pub. Date: Jun. 22, 1995

[30] Foreign Application Priority Data
Dec. 16, 1993 [DE] Germany ............ 43 42 933.5

[51] Int. Cl.$^6$ .................................. B62D 5/09
[52] U.S. Cl. ................. 180/417; 60/384; 180/441
[58] Field of Search ................... 180/414, 417, 180/441; 60/384, 385; 137/625.21

[56] References Cited

U.S. PATENT DOCUMENTS

| | | |
|---|---|---|
| 4,620,416 | 11/1986 | Yip et al. .................. 180/441 |
| 4,696,161 | 9/1987 | Rasmussen et al. .......... 60/384 |
| 4,730,544 | 3/1988 | Jorgensen ................. 60/384 |

*Primary Examiner*—Jesus D. Sotelo
*Attorney, Agent, or Firm*—Lee, Mann, Smith, McWilliams, Sweeney & Ohlson

[57] ABSTRACT

In a device for controlling the pressure to be supplied to a hydrostatic steering unit (1) by means of a control signal (s), there is a rotary slide valve arrangement, one slide valve element of which is rotatable by means of a steering means (5) and the other slide valve element of which is corrected by means of a measuring motor (16). Together with a series throttle (AV), a control throttle (AS) forms a series circuit independent of the intake path of the steering motor (4), which circuit is connected between a pressure source (CF) and the tank (6). The control throttle (AS) has a closing characteristic that extends substantially across the entire working range of the angle of rotation of the slide valve elements. The control signal (s) is tapped between the series throttle (AV) and the control throttle (AS). This provides a pressure control that is independent of load.

11 Claims, 3 Drawing Sheets

DEVICE FOR CONTROLLING THE PRESSURE TO BE SUPPLIED TO A HYDROSTATIC STEERING UNIT

The invention relates to a device for controlling the pressure to be supplied to a hydrostatic steering unit by means of a control signal, having a pressure control device and a rotary slide valve arrangement, one slide valve element of which is rotatable by means of a steering means, the other slide valve element of which is corrected by means of a measuring motor through which the flow passes, and both slide valve elements of which are rotatable relative to one another through a limited angle of rotation on either side of a neutral setting, and both slide valve elements have control openings which form at least one first throttle, which is closed in the neutral setting, in the intake path to a steering motor, at least one second throttle, which is closed in the neutral setting, in the return of the steering motor, and at least one control throttle which is open in the neutral setting and is connected between a tap for the control signal and the tank.

In known devices of that kind (DE-PS 36 35 162, U.S. Pat. No. 4,620,416) the control signal is tapped at a point lying between two throttles arranged in the intake path, namely, a measuring throttle and a further throttle; the tap point is connected by way of a control throttle to the tank side. When the steering means is operated, the control throttle must close after the smallest possible angle of rotation, because otherwise, as the throttles lying in the intake path open, a part of the fluid under pressure intended for the steering motor escapes by way of the control throttle. With relatively large angles of rotation, a control signal of such magnitude is produced that the pressure drop at the measuring throttle in the intake path is held constant. The transition from the first type of determination of the control signal by the control throttle to the second type of determination of the control signal by the measuring throttle causes an undesirable increase in the control signal during operation, that is to say, an undesirable increase in the so-called LS pressure, and consequently an undesirable change in pressure in the motor lines.

The load acting on the steering motor additionally influences the control signal. If, if fact, negative control forces are acting on the steering motor, a negative pressure occurs in the steering motor. This is the case, for example, when the speed of the piston of the steering motor exceeds a maximum value predetermined by the construction of the steering unit. The negative pressure causes fluid under pressure to be sucked by way of the intake path, which leads to a corresponding drop in pressure at the measuring throttle. As a result, the control signal changes, so that the pressure control device generates a reduced pressure.

The invention is based on the problem of providing a device of the kind mentioned in the introduction, with which the needs of practice can be fulfilled even better than before.

This problem is solved according to the invention in that the control throttle, together with a series throttle, forms a series circuit independent of the intake path of the steering motor, which circuit is supplied from a pressure source and has a closing characteristic that extends substantially across the entire working range of the angle of rotation of the slide valve elements.

In this construction, there is no dependency on the load of the steering motor. On the contrary, the control signal is matched by the choice of the closing characteristic to the actual steering requirement, as preset by the relative rotation of the two slide valve elements with respect to one another.

For that purpose, the control throttle is effective over the entire working range of the angle of rotation. This is possible because the control throttle is not connected to the intake path. For that reason, there is also no change from a first to a second kind of determination of the control signal. The amount flowing of by way of the series circuit can be small. In practice, it is determined by supplying sufficient fluid under pressure to the steering unit during the time the device is at a standstill to maintain the temperature of the steering unit.

A further advantage is that a measuring throttle in the intake path is unnecessary. This leads to a reduction in production costs. In addition, the pressure drop across the steering unit is less, which increases its degree of efficiency. There is also no need to let such a measuring throttle open simultaneously with another throttle, which is more complex in production engineering terms. On the contrary, the individual throttles do not need to open exactly simultaneously. Because the pressure is not load-dependent, in many cases even replenishing valves can be omitted.

In particular, the opening cross-section of the control throttle per unit of angle of rotation close to the neutral setting can decrease more sharply than with larger angles of rotation. In this manner, a relatively large control signal is obtained right at the start of operation of the steering means, so that a correspondingly high pressure is made available at the pressure control device, be it a variable pump or a control valve, for example, a priority valve. As soon as the path running by way of the steering motor is open both on the intake side and on the return side, the steering motor is able to be operated with corresponding force.

It is especially advantageous for the closing characteristic to comprise three segments having a different decrease in opening cross-section per unit of angle of rotation, namely, a first segment having a relatively steep decrease between the neutral setting and, for example, the start of opening of the first throttle, a second segment having a relatively small decrease, which extends approximately to opening of the second throttle, and third segment having an even smaller decrease across the remainder of the working range of the angle of rotation. In this manner, the fact that the individual throttles in the steering unit open at different intervals can be taken into account. Pressure corresponding to the respective degree of opening of the throttles is always available.

Structurally, it is advisable for the control throttle to consist of at least two partial throttles connected in parallel, of which the first closes after a small angle of rotation whilst the second remains open. Using the partial throttles, it is possible to achieve the desired closing characteristic particularly well.

Two partial throttles are sufficient, in particular when the opening cross-section of the second partial throttle decreases more sharply per unit of angle of rotation in a first angle of rotation range than in a second angle of rotation range.

The pressure source is especially advantageously formed by the controlled output of the pressure control device.

In this connection, it is expedient for the series throttle to be accommodated in the pressure control device.

In a preferred alternative, the pressure source is formed by a region inside the steering unit carrying the input pressure. Commercially available steering units require only slight modifications for that purpose.

In a preferred embodiment, provision is made for an inner sleeve as the first slide valve element and an outer sleeve as the second slide valve element to be arranged in a housing, and for these parts to be provided with annular ducts, axial ducts and control ports to form connecting channels and throttles, and for an annular duct connected to a control signal output to be connected by way of the series throttle to an annular duct carrying the input pressure of the steering unit and to be connected by way of the control throttle to a space in the steering unit carrying a tank pressure. This results in a very space-saving construction.

Advantageously, two series throttles are provided, of which each one is rendered effective in dependence on the relative direction of rotation of the slide valve elements. In that case, the series throttle can be of a similar construction to all the other throttles at the sleeves, with, however, the two possible directions of rotation being taken into account.

This is similarly advisable for the control throttles, two of which should be provided and of which a respective one is rendered effective in dependence on the relative direction of rotation of the slider elements.

Figure 2:
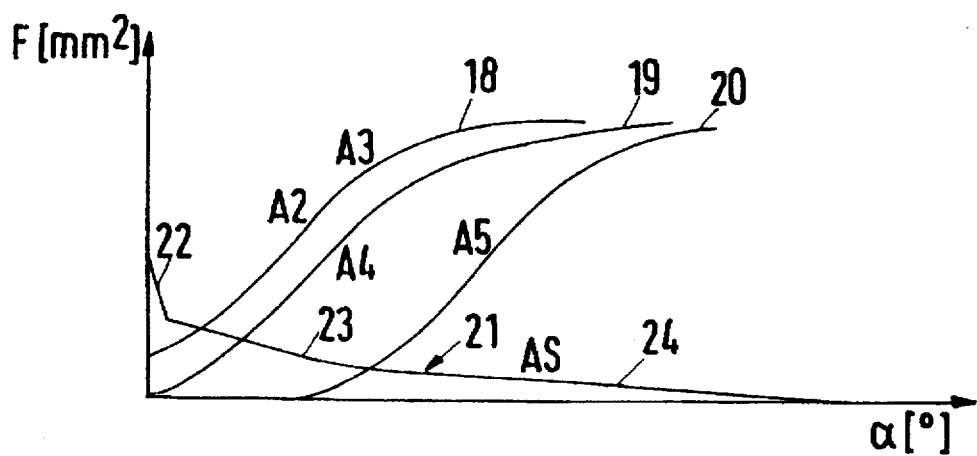
Figure 3:
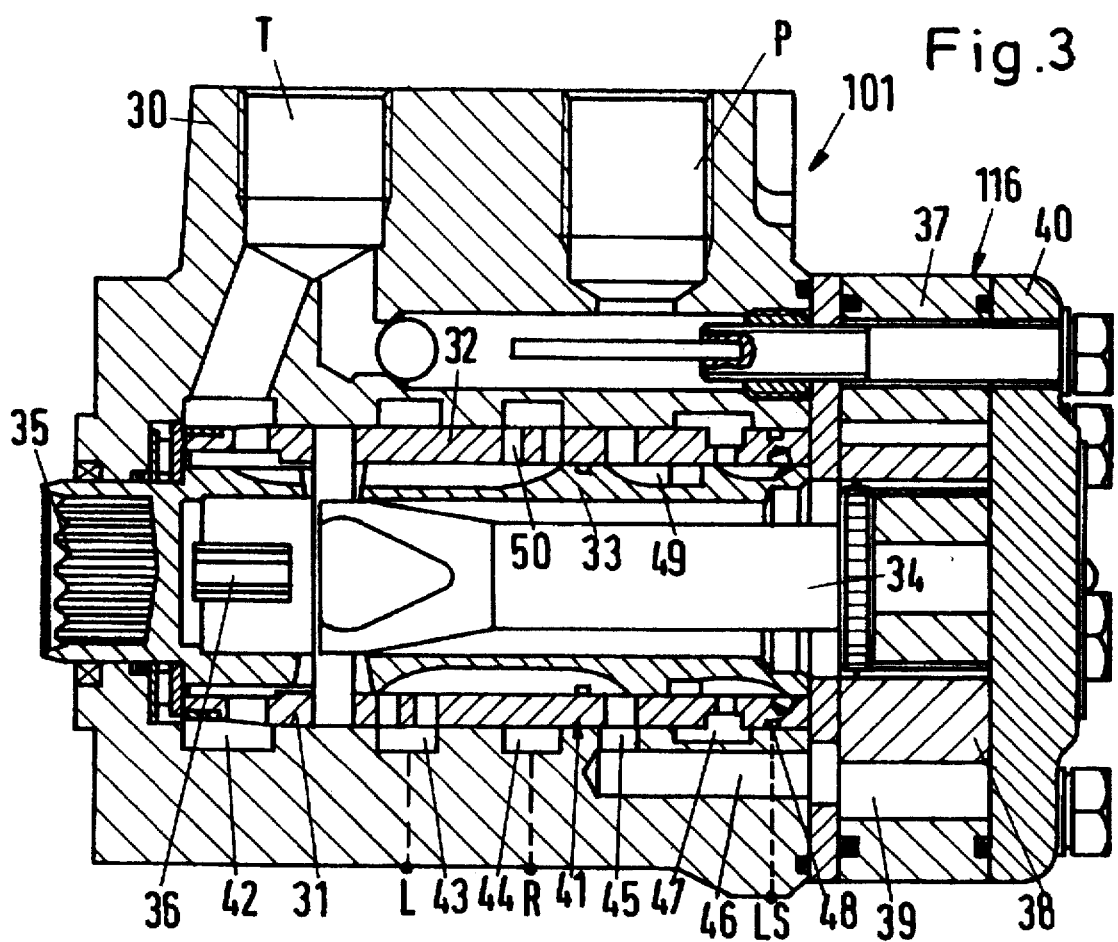
Figure 4:
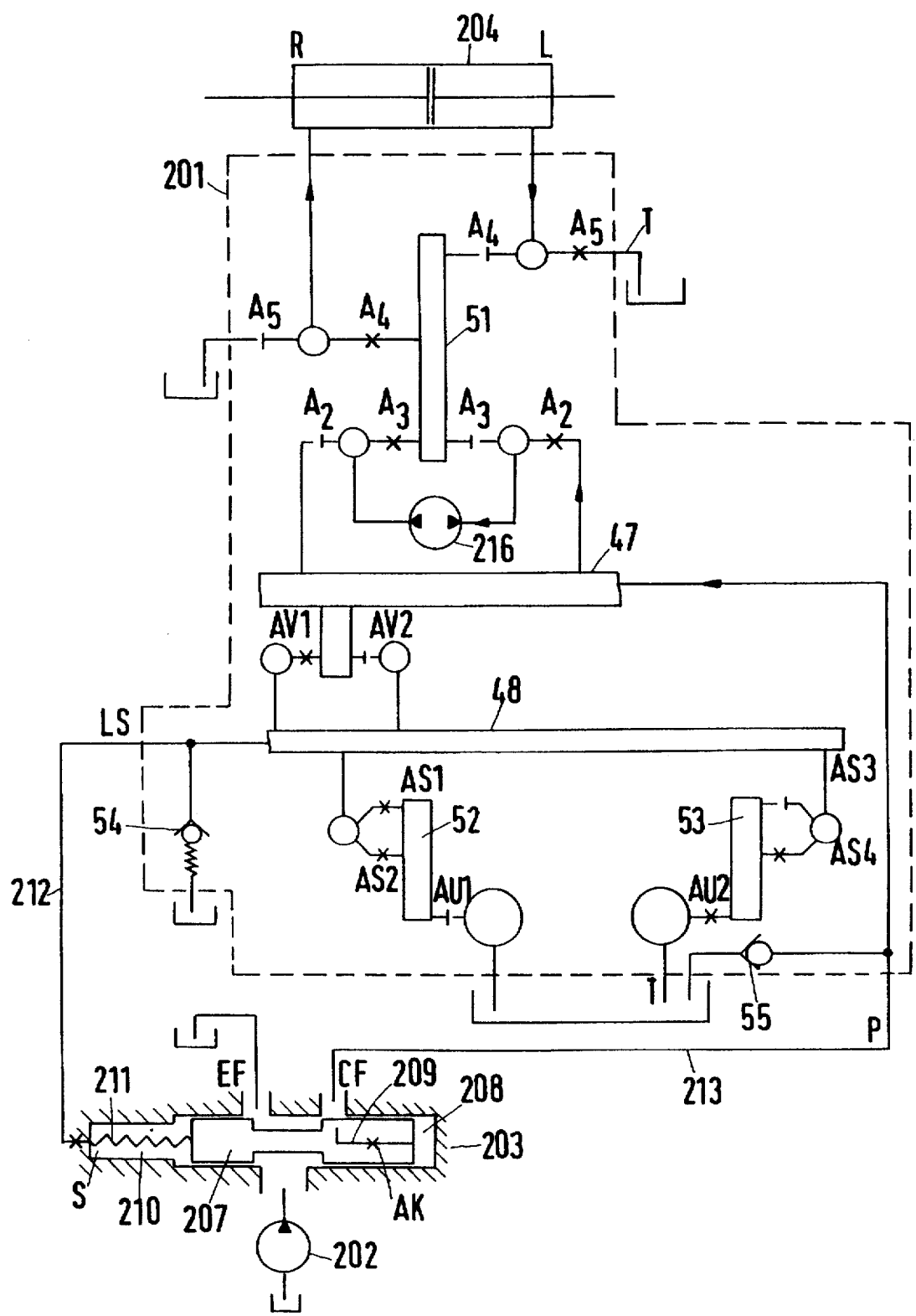

The invention is explained in greater detail hereinafter with reference to preferred embodiments illustrated in the drawings, in which FIG. 1 shows diagrammatically a steering device with a control device according to the invention, FIG. 2 shows a graph of the opening cross-section of the throttles plotted against the relative angle of rotation α, FIG. 3 is a section through a steering unit which can be used according to the invention, and FIG. 4 is a circuit diagram relating to this steering unit.

FIG. 1 shows a steering unit 1, which is supplied by a pump 2 with a constant delivery-volume of fluid under pressure by way of a pressure control device 3 in the form of a controllable valve, and operates a steering motor 4 in dependence on the actuation of a steering means 5. The pressure control device 3 has a first output CF, at which the control pressure can be tapped, and a second output EF which supplies excess fluid either to the tank 6 or to a further load. The desired pressure is set at the output CF by means of a slide valve 7. In the right-hand pressure chamber 8 the pressure is the same as at the output CF because both are connected to one another by way of a line 9 having a fixed throttle AK. A spring 11 acts in the left-hand pressure chamber 10, and the pressure is somewhat lower because the output CF is connected to the pressure chamber 10 by means of a line 9a having a constant series throttle AV, and fluid is able to flow onwards from the pressure chamber 10 by way of a line 12 and a control throttle AS to the tank 6. The pressure chamber 10 therefore forms the tap of a series circuit lying between the output CF and the tank 6, and comprising the series throttle AV and the control throttle AS; a control signal s in the form of a control pressure can be tapped off at this tap.

The steering unit 1 has an input P on the pressure side, which input is connected by way of a line 13 to the output CF of the pressure control device 3, an output T on the tank side, which output is connected to the tank 6, two motor ports R and L, which are connected to the steering motor 4, and a control signal port LS, to which the line 12 is connected. On the intake side 14, there are arranged in succession a non-return valve 15, a throttle A2, a measuring motor 16, a throttle A3 and a throttle A4. On the return side 17 there is a throttle A5. The throttles A2 and A3 serve essentially to connect the measuring motor 16 into the intake path. The throttles A4 and A5 are closed in the neutral setting of the steering unit and open when the steering means 5 is operated, the throttle A5 opening later than the throttle A4. The control throttle AS is opened in the neutral setting and closes gradually during operation of the steering means.

The construction of such a steering unit, with the exception of the circuit arrangement for the control throttle AS, is generally well known, for example from the ORBITROL steering units of the Applicant or from DE-PS 36 35 162. In such steering units, the steering means 5, for example a steering handwheel, acts on a first rotary slide valve element and the measuring motor 16 acts on a second rotary slide valve element. The relative angle of rotation α between the two rotary slide valves is responsible for opening the throttles. By turning the steering means 5, the throttles in the intake path and in the return path are opened. The measuring motor 16 is actuated by the fluid under pressure then flowing, whereupon the said throttles are again moved in the closing direction. The steering lock is determined by the amount of fluid under pressure reaching the steering motor 4, the steering speed is determined by the opening of the individual throttles. The closing characteristic of the control throttle AS is selected so that even relatively large amounts of fluid under pressure are conveyed to the steering motor 4 at sufficient pressure.

In FIG. 2, the opening area of the individual throttles is plotted against the relative angle of rotation α of the rotary slide valve elements. The characteristic 18 corresponds to the throttles A2 and A3, the characteristic 19 corresponds to the throttle A4, the characteristic 20 corresponds to the throttle A5 and the characteristic 21 corresponds to the control throttle AS. It is to be noted that in the neutral setting the throttles A2 and A3 are open, but the throttles A4 and A5 are closed. The throttle A4 opens at a small relative angle of rotation, the throttle A5 opens at a somewhat larger angle of rotation. As the angle of rotation increases, the opening cross-sections increase up to a maximum value.

The control throttle AS is fully open in the neutral setting. Its closing characteristic 21 extends essentially over the entire working range of the angle of rotation. In this particular embodiment, it comprises three segments 22, 23 and 24. In the first segment 22, which is effective at the start of the steering operation, the throttle cross-section is considerably reduced. The pressure of the control signal s increases to a corresponding degree. When the throttle A4 therefore starts to open, there is already a considerable work pressure available at the output CF of the pressure control device. The second segment 23, which extends approximately from the start of opening of the throttle A4 to the start of opening of the throttle A5, has a less steep slope. The opening cross-section of the control throttle continues to decrease, but at a slower rate per angular unit. The third segment 24, which covers the remainder of the range of the angle of rotation, has an even shallower slope. The further increase in the pressure of the control signal caused by this serves merely to compensate for the higher counter-forces occurring as a result of the rapid steering movement. The characteristic 21 need not, of course, be composed of straight line segments; on the contrary, it can have a continuous transition between the individual segments.

The steep initial segment 22 ensures that the slide valve in the pressure control device 3 is opened quickly in the direction of a further opening of the output CF. When the last throttle A4 in the forward path opens, the high work pressure is already available. When the throttle A5 starts to open as rotation of the steering wheel continues, and the actual steering action is able to start, a large pressure is present at the steering motor 4 which leads to immediate adjustment of the steering motor with sufficient force.

A modified steering unit is illustrated in FIG. 3. The steering unit 101 has a housing 30 with a housing bore 31. In this bore there is rotatably mounted an outer sleeve 32 and within the latter there is rotatably mounted an inner sleeve 33. A link shaft 34 connects a measuring motor 116 to the outer sleeve 32. The inner sleeve 33 is connectible by way of a coupling 35 to a steering means 5. The inner and outer sleeves are joined to one another by means of leaf springs 36, which allow a limited relative rotation. The measuring motor 116 is a gearwheel motor which has an outer toothed ring 37 and an inner gearwheel 38, between which there are displacement chambers 39, the whole of which is covered by a cover 40. The sleeves 32 and 33 form two slide valve elements of a rotary slide valve arrangement 41. There is an annular duct 42, which is connected to the tank port T, an annular duct 43, which is connected to the left-hand motor port L, an annular duct 44, which is connected to the right-hand motor port R, a series of control openings 45, which are connected by way of axial ducts 46 to respective displacement chambers 39, an annular duct 47, which is connected to the pressure port P, and an annular duct 48, which is connected to the control signal port LS. Moreover, there are a number of axial ducts, for example, 49, and a number of control openings, for example, 50. Together, they all form the connecting ducts and throttles that are required for such a steering unit.

Where this steering unit differs from known proposals according to DE-PS 36 35 162 is explained with reference to FIG. 4. Reference numbers increased by 200 are used in that Figure for corresponding parts. One can see that the fluid under pressure supplied by way of the line 213 reaches the annular duct 47 and from there passes by way of one of the throttles A2, the measuring motor 216, one of the throttles A3, a distributor duct 51 and one of the throttles A4 to the motor port R, while the return is effected by way of the motor port L and the throttle A5 to the tank port T. The respective other throttle A2, A3, A4, A5 is required for the respective other direction of rotation of the rotary slide valve arrangement 41.

The annular duct 48, which is connected to the control signal port LS, is connected by way of a fixed series throttle AV1 to the annular duct 47 carrying the input pressure. The similar second series throttle AV2 is effective when steering is in the opposite direction of rotation. Moreover, the annular duct 48 is connected by way of two parallel control partial throttles AS1 and AS2 to a distributor duct 52, and by way of two parallel control partial throttles AS3 and AS4 to a control duct 53. One partial throttle AS1, AS3 can be completely closed after a short angle of rotation, so that only the other partial throttle AS2, AS4 is effective. The distributor ducts 52 and 53 are connected by way of a respective change-over throttle AU1 and AU2 to the tank output T. The change-over throttles ensure that each control partial throttle is effective in the correct direction.

Here too, there is accordingly a series connection of a series throttle AV1, AV2 and a respective control throttle AS1, AS2, and AS3, AS4 between a pressure source (annular duct 47) and the tank output T, with a tap for the control signal s in the annular duct 48. The pressure of the control signal s and the spring 211 consequently acts from the left on the slide valve 207, whereas the pressure at the output CF is effective from the right.

Moreover, a pressure relief valve 54 for limiting the pressure of the control signal s and a suction valve 55 equalizing negative pressure states in the line 213 are provided.

The embodiments described can be modified in many ways, without departing from the basic concept of the invention. For example, the rotary slide valves can also be constructed as flat slide valves, as known from DE-PS 32 43 402. A variable pump can also be used as the pressure control device. The control device according to the invention is especially suitable for hydrostatic steering units for vehicles.

I claim:
1. A device for controlling the pressure to be supplied to a hydrostatic steering unit by means of a control signal, having a pressure control device and a rotary slide valve arrangement, having at least two slide valve elements, one of said slide valve elements being rotatable by means of a steering means, another of said slide valve elements including means for correction by means of a measuring motor through which the flow passes, said slide valve elements being rotatable relative to one another through a limited angle of rotation on either side of a neutral setting, and said slide valve elements have control openings which form at least one first throttle, said first throttle being closed in the neutral setting in an intake path to a steering motor, at least one second throttle, said second throttle being closed in the neutral setting in a return of the steering motor, and at least one control throttle, said control throttle being open in the neutral setting and being connected between a tap for the control signal and tank, the control throttle, together with a series throttle, forming a series circuit independent of the intake path of the steering motor, said circuit being supplied from a pressure source and having a closing characteristic that extends substantially across an entire working range of the angle of rotation of the slide valve elements.

2. A device according to claim 1, in which the control throttle has an opening cross-section per unit of angle of rotation close to the neutral setting which decreases more sharply than with larger angles of rotation.

3. A device according to claim 2, in which the closing characteristic comprises three segments having a different decrease in opening cross-section per unit of angle of rotation, a first segment having a relatively steep decrease between the neutral setting and the start of opening of the first throttle, a second segment having a relatively small decrease, which extends approximately to opening of the second throttle, and third segment having an even smaller decrease across the remainder of the working range of the angle of rotation.

4. A device according to claim 2, in which the control throttle consists of at least two partial throttles connected in parallel, the first being formed to close after a small angle of rotation and the second remaining open.

5. A device according to claim 4, in which the opening cross-section of the second partial throttle decreases more sharply per unit of angle of rotation in a first angle of rotation range than in a second angle of rotation range.

6. A device according to claim 1, in which the pressure source is formed by controlled output of the pressure control device.

7. A device according to claim 6, in which the series throttle is located in the pressure control device.

8. A device according to claim 1, in which the pressure source is formed by an annular duct 47 inside the steering unit carrying the input pressure.

9. A device according to one of claim 1 in which the first slide valve element comprises an inner sleeve, the second slide valve element comprises an outer sleeve, the second slide valve element comprises said sleeves being located in a housing, and including annular ducts, axial ducts and control ports to form connecting channels and throttles, and a further annular duct connected to a control signal output being connected by way of the series throttle to an additional annular duct carrying the input pressure of the steering unit and being connected by way of the control throttle to a space in the steering unit carrying tank pressure.

10. A device according to claim 9, including two series throttles, each of said throttles being rendered effective in dependence on the relative direction of rotation of the slide valve elements.

11. A device according to claim 9, including two control throttles, one of said control throttles being rendered effective in dependence on the relative direction of rotation of the slider elements.

* * * * *